US006561778B2

(12) United States Patent  (10) Patent No.: US 6,561,778 B2
Evans  (45) Date of Patent: May 13, 2003

(54) AUTOMOTIVE WINDSHIELD REPAIR BRIDGE

(76) Inventor: Timothy D. Evans, P.O. Box 1313, Monument, CO (US) 80132

( * ) Notice: Subject to any disclaimer, the term of this patent is extended or adjusted under 35 U.S.C. 154(b) by 181 days.

(21) Appl. No.: 09/771,075

(22) Filed: Jan. 29, 2001

(65) Prior Publication Data

US 2002/0100537 A1 Aug. 1, 2002

(51) Int. Cl.[7] .............................................. B32B 35/00
(52) U.S. Cl. ........................ 425/12; 156/94; 264/36.1; 425/13
(58) Field of Search .............................. 156/94; 425/12, 425/13; 264/36.1

(56) References Cited

U.S. PATENT DOCUMENTS 5,591,460 A * 1/1997 Wanstrath et al. ....... 264/36.21
5,614,046 A * 3/1997 Campfield .................. 156/94
5,670,180 A * 9/1997 Mackey et al. .......... 264/36.21

* cited by examiner

Primary Examiner—Michael W. Ball
Assistant Examiner—Gladys Corcoran
(74) Attorney, Agent, or Firm—G. F. Gallinger

(57) ABSTRACT

An improved repair bridge for windshield repair which is easier to drag along in proper position, a repair bridge which inherently applies a balanced force on opposite sides of the chip/crack, a bridge which requires substantially less adjustment bolt force, and which is provided with an adjustment bolt force gauge so that even a novice will be able to apply optimum crack spreading force without enlarging the crack. The generally U shaped bridge comprises: a left arm portion, a right arm portion, and a middle portion extending between and connecting the arm portions. Two upright finger bolts are each matingly threaded through an unconnected end portion of one of the arms; and, two plastic suction cups are each carried by a central portion of one of the arms. An upright resin injection head is adjustably screwed through the middle portion. The resin injection head is positioned above one end portion of the chip/crack; the suction cups are adhered on opposite sides of the chip/crack; and, the finger bolts are tightened down against the windshield thereby pressing the resin injection head down marginally spreading the chip/crack. Then the injection head may be slid along and over the chip/crack to inject resin into the chip/crack.

6 Claims, 1 Drawing Sheet

US 6,561,778 B2

AUTOMOTIVE WINDSHIELD REPAIR BRIDGE

FIELD OF THE INVENTION

This invention relates to the repair of stone chips and related cracks in automotive windshields. More particularly this invention relates to a generally U shaped repair bridge which maintains and presses a resin injection head downwardly on a chip/crack on an underlying windshield. The bridge better controls and balances downward pressure about the chip/crack. The bridge additionally facilitates improved visibility of the chip/crack, and proper bridge position while dragging along the chip/crack.

BACKGROUND OF THE INVENTION

The windshield chip/crack repair industry currently employs an X shaped bridge having a resin injection head and a finger pressure adjusting bolt on opposite ends of one cross arm, and suction cups on opposite ends of the other cross arm. One problem with this bridge is that it is difficult to drag along a chip/crack in a windshield in proper position, without the adjusting bolt passing over and pressing on the chip/crack. If the bridge is turned obliquely while dragged along the chip/crack to avoid pressing directly on the chip/crack there is an extremely narrow band between a flattened suction cup and the downwardly pressing adjusting bolt. Another problem is that the X shaped bridge does not apply a balanced force on opposite sides of the chip/crack. The X shaped bridge to a large degree blocks visibility of the chip/crack. Yet another problem with the X shaped bridge is that it is difficult to gauge downward force exerted by the pressure adjusting bolt on the windshield. A less experienced individual may inadvertently apply too great of a force on the windshield with the adjusting screw and thereby substantially elongate the chip/crack.

Within this specification chip/crack is defined to mean a chip and a related crack extending from the chip, or a crack alone, or a chip alone. Within this specification generally U shaped is defined so broadly as to include generally V shaped or any combination of a U and a V shape.

OBJECTS OF THE INVENTION

It is an object of this invention to disclose a better repair tool for the repair of an automotive windshield chip/crack. It is an object of this invention to disclose a bridge which is relatively easy to drag along and over a crack on a windshield without pressing the pressure adjusting bolt thereon directly down on the chip/crack. It is yet a further object of this invention to disclose a bridge which applies a balanced force on opposite sides of a chip/crack. It is yet a further object of this invention to disclose a bridge which utilizes a mechanism which facilitates regulating the downward force applied on a windshield to spread a crack. It is yet an additional object of this invention to disclose a bridge which utilizes two adjusting bolts, one on each opposite side of the chip/crack. When two adjusting screws are utilized each screw only presses downwardly with one half of the total force exerted at the resin injection head. It is a final object of this invention to disclose a repair bridge which is much easier to use to repair a windshield. A repair bridge which is easier to drag along in proper position, a repair bridge which inherently applies a balanced force on opposite sides of the chip/crack, a bridge which requires substantially less adjustment bolt force, and which is provided with an adjustment bolt force gauge so that even a novice will be able to apply optimum crack spreading force without enlarging the crack.

One aspect of this invention provides for a generally U shaped bridge for repairing a chip/crack on an underlying automotive windshield. The U shaped bridge comprises: a left arm portion having an unconnected end portion, a central portion, and a connected end portion; a right arm portion having an unconnected end portion, a central portion, and a connected end portion; and, a middle portion extending between and connecting the connected end portions of the arm portions. Two upright finger bolts are each matingly threaded through an unconnected end portion of one of the arms. Two plastic suction cups are each carried by a central portion of one of the arms. The suction cups are oriented to removably and slidingly adhere to the underlying automotive windshield. An upright resin injection head is matingly and adjustably screwed through a mid portion of the middle portion. The head has a discharge end portion directed to the underlying automotive windshield. The resin injection head is positioned above one end portion of the chip/crack; the suction cups are adhered on opposite sides of the chip/crack; and, the finger bolts are tightened down against the windshield thereby pressing the resin injection head down on, and marginally spreading the chip/crack. Then the injection head may be slid along and over the chip/crack to inject resin into the chip/crack.

In a preferred aspect of this invention each finger bolt includes a sprung pressure gauging end pin so that the downward pressure applied against the windshield may be adjusted to an acceptable range by turning the finger bolt until the end pin is partially depressed into the bolt.

Various other objects, advantages and features of this invention will become apparent to those skilled in the art from the following description in conjunction with the accompanying drawings.

FIGURES OF THE INVENTION

Figure 1:
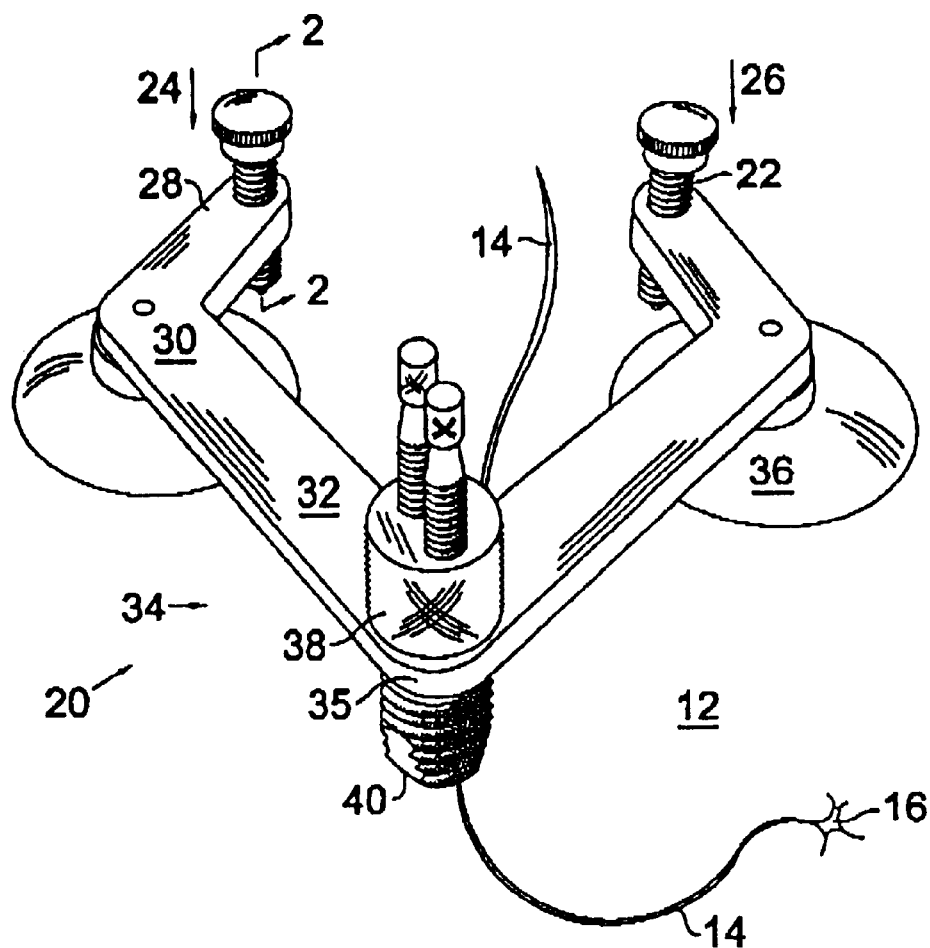
FIG. 1 is a perspective view of a generally U shaped automotive windshield repair bridge having two pressure gauging adjusting bolts.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a generally U shaped automotive windshield repair bridge 20. The bridge 20 for repairing a chip 16/crack 14 on an underlying automotive windshield 12 comprises: a left arm portion 24 having an unconnected end portion 28, a central portion 30, and a connected end portion 32; a right arm portion 26 having an unconnected end portion 28, a central portion 30, and a connected end portion 32; and, a middle portion 34 extending between and connecting the connected end portions 32 of the arm portions 24,26. Two upright finger bolts 22, are each matingly threaded through an unconnected end portion 28 of one of the arms 24,26. Two plastic suction cups 36 are each carried by a central portion 30 of one of the arms 24,26. The suction cups 36 are oriented to removably and slidingly adhere to the underlying automotive windshield 12. An upright resin injection head is matingly and adjustably screwed through a portion 35 of the middle portion 34. The head 38 has a discharge end portion 40 directed to the underlying automotive windshield 12.

The resin injection head 38 is positioned above one end portion of the chip 16/crack 14, the suction cups 36 are adhered on opposite sides of the chip 16/crack 14, the finger bolts 22 are tightened down against the windshield 12 thereby pressing the resin injection head 38 down on, and marginally spreading the chip 16/crack 14. Then the injection head 38 may be slid along and over the chip 16/crack 14 to inject resin into the chip 16/crack 14.

In a preferred embodiment of the invention the arms 24,26 and middle portions of the bridge 20 are cut from a plate metal which is aluminum. In the most preferred embodiment of the invention each arm 24,26 of the bridge 20 is generally straight between the adjusting bolt 22 and the suction cup 36. Additionally, the bridge 20 is generally straight between each suction cup 36 and the resin injection head 38.

Figure 2:
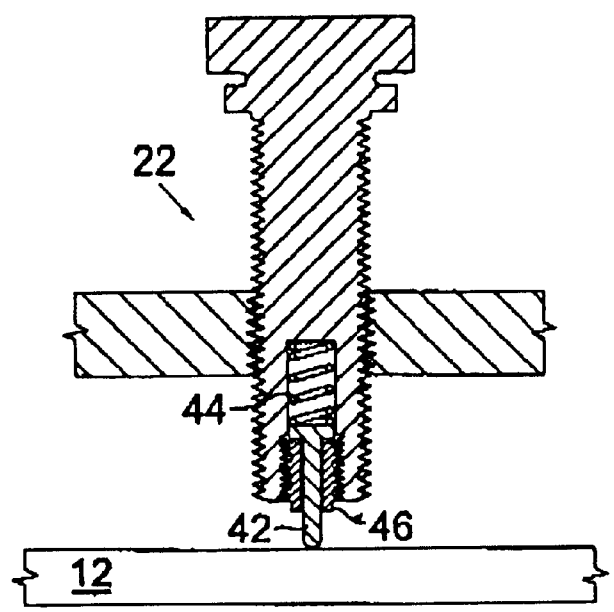
FIG. 2 is a cross sectional view of the pressure gauging adjusting bolt taken along line 2—2 on FIG. 1.

FIG. 2 is a cross sectional view of the pressure gauging adjusting bolt 22 taken along line 2—2 o on FIG. 1. Most preferably each finger adjusting bolt 22 includes a sprung pressure gauging end pin 42 so that the downward pressure applied against the windshield 12 may be adjusted to an acceptable range by turning the finger bolt 22 until the end pin 42 is partially depressed into the bolt 22. In the most preferred embodiment the finger bolt 22 is plastic. The end pin 42 extends longitudinally from a bottom end portion of the bolt 22 forced downwardly by a spring 44 and retained in the bottom end portion of the bolt 22 by a screwed retaining ring 46.

While the invention has been described with preferred specific embodiments thereof, it will be understood that this description is intended to illustrate and not to limit the scope of the invention, which is defined by the following claims.

I claim:

1. A generally U shaped bridge for repairing a chip/crack on an underlying automotive windshield comprising:

a left arm portion having an unconnected end portion, a central portion, and a connected end portion;

a right arm portion having an unconnected end portion, a central portion, and a connected end portion;

a middle portion extending between and connecting the connected end portions of the left and right arm portions;

two upright finger bolts, each matingly threaded through an unconnected end portion of one of the left and right arm portions;

two plastic suction cups, each carried by a central portion of one of the left and right arm portions and oriented to removably and slidingly adhere to the underlying automotive windshield; and, an upright resin injection head matingly and adjustably screwed through a mid portion of the middle portion, said head having a discharge end portion directed to the underlying automotive windshield;

so that when the resin injection head is positioned above one end portion of the chip/crack, and the suction cups are adhered on opposite sides of the chip/crack, and the finger bolts are tightened down against the windshield thereby pressing the resin injection head down on, and marginally spreading the chip/crack; then the injection head may be slid along and over the chip/crack to inject resin into the chip/crack.

2. A bridge as in claim 1 wherein the left arm, right arm, and middle portions thereof are cut from plate metal.

3. A bridge as in claim 2 wherein the metal is aluminum.

4. A bridge as in claim 1 wherein each arm of the bridge is generally straight between the upright finger bolt and the suction cup; and wherein the bridge is generally straight between each suction cup and the resin injection head.

5. A bridge as in claim 1 wherein each upright finger bolt includes a sprung pressure gauging end pin so that the downward pressure applied against the windshield may be adjusted to an acceptable range by turning the upright finger bolt until the end pin is partially depressed into the upright finger bolt.

6. A bridge as in claim 5 wherein the finger bolt is plastic and wherein the end pin extends longitudinally from a bottom end portion of the upright finger bolt forced downwardly by a spring and retained in the bottom end portion of the upright finger bolt by a screwed retaining ring.

* * * * *